United States Patent [19]
Berg

[11] 4,250,793
[45] Feb. 17, 1981

[54] CUSHIONING DEVICE FOR FLUID JACKS
[75] Inventor: Lawrance F. Berg, Lockport, Ill.
[73] Assignee: Caterpillar Tractor Co., Peoria, Ill.
[21] Appl. No.: 967,801
[22] Filed: Nov. 20, 1978
[51] Int. Cl.³ .......................... F15B 15/22; F01B 11/02
[52] U.S. Cl. ....................................... 91/407; 92/85 B; 188/287
[58] Field of Search .................. 92/85 B, 143; 91/407, 91/408; 188/287, 286, 289

[56] References Cited

U.S. PATENT DOCUMENTS

| | | | |
|---|---|---|---|
| 2,935,051 | 5/1960 | Fuller et al. | 92/85 B |
| 3,162,092 | 12/1964 | Corwin | 91/407 |
| 3,605,409 | 9/1971 | Heese et al. | 92/85 B |
| 3,877,344 | 4/1975 | Langland | 92/143 |
| 4,043,254 | 8/1977 | Jaeger | 92/85 B |
| 4,065,112 | 12/1977 | Leskovec et al. | |

FOREIGN PATENT DOCUMENTS 2705836  2/1977  Fed. Rep. of Germany .

*Primary Examiner*—Paul E. Maslousky
*Attorney, Agent, or Firm*—John W. Grant

[57] ABSTRACT

A fluid jack (10) has a cushioning device (21) positioned within a cylinder (11) between a piston means (12) and a closed end (13) with the cushioning device (21) being a self-contained unit independent of any major components of the fluid jack (10). A variable volume chamber (24) is formed between a pair of members (22,23) with the cushioning taking place by metering the fluid expelled from the variable volume chamber (24) in response to the piston means (12) engaging and moving one of the members (22,23) in a direction for decreasing the volume of the variable volume chamber (24).

3 Claims, 1 Drawing Figure

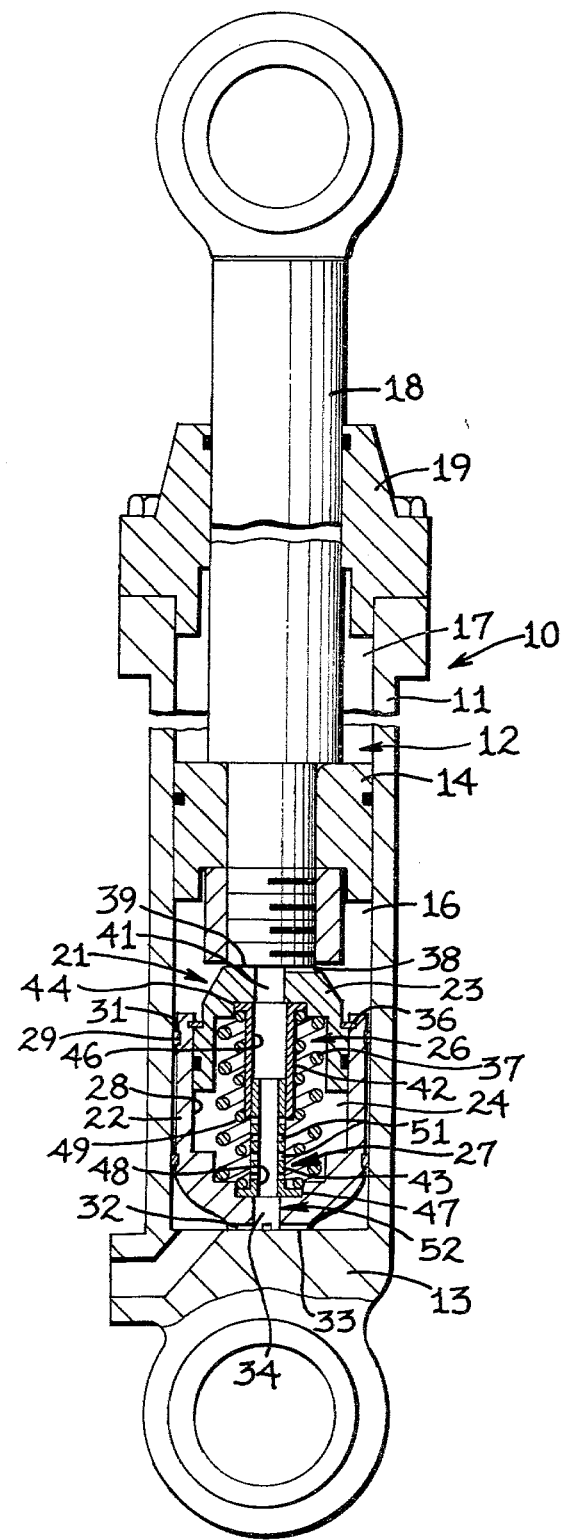

CUSHIONING DEVICE FOR FLUID JACKS

DESCRIPTION

TECHNICAL FIELD

This invention relates to a fluid jack, and more particularly to a self-contained cushioning device floatingly positioned within a cylinder of the fluid jack between a closed end of the cylinder and a piston.

BACKGROUND ART

Cushioning devices are often used in fluid jacks to reduce or dampen inertia loads at the end of stroke movement of the piston. Such devices generally function by trapping fluid in a chamber as the piston approaches the end of the cylinder and controllably bleeding the trapped fluid from the cylinder. Such devices are exemplified by U.S. Pat. No. 4,065,112 issued to E. V. Leshovec et al on Dec. 27, 1977, and U.S. Pat. No. 4,043,254 issued to Eginhard Jaeger on Aug. 23, 1977; and German Patent No. 2,705,836.

The components of the heretofore known cushioning devices have been included as integral portions of existing major components of the fluid jacks. Thus, providing a cushioning device for a specific fluid jack required redesigning some of the major components of the fluid jack. Further, to insure proper alignment of the mating parts requires exacting machining tolerances and consequently more precise machining of the components. Finally, in some designs, replacing a damaged component of the cushioning device also requires replacing one of the major components of the fluid jack.

DISCLOSURE OF INVENTION

The invention solves the problem of having to redesign some of the major components of a fluid jack to provide a cushioning device therefor by constructing the cushioning device as a self-contained unit which can be floatingly positioned within a cylinder of the fluid jack between a closed end thereof and the piston.

In one aspect of the present invention, a fluid jack has a piston reciprocatably positioned within a cylinder and movable toward and away from a closed end of the cylinder and a cushioning device floatingly positioned within the cylinder between the piston and the closed end of the cylinder, said cushioning device has a first member slidably positioned within the cylinder and has a bore therein, a second member is slidably positioned within said bore, means forms a variable volume chamber between said first and second members, and means meters fluid from said chamber in response to relative movement between said first and second members in a direction for decreasing the volume of said variable volume chamber.

BRIEF DESCRIPTION OF DRAWINGS

The sole FIGURE is a diagrammatic sectional view of an embodiment of the present invention.

BEST MODE FOR CARRYING OUT THE INVENTION

Referring now to the drawing, a fluid jack 10 has a cylinder 11 and piston means 12 reciprocatably positioned within the cylinder and movable toward and away from a closed end 13 of the cylinder. The piston means 12 includes a piston 14 separating the cylinder into first and second chambers 16, 17 and a piston rod 18 slidably extending through an end cap 19 and having an end connected to the piston.

A cushioning device 21 is floatingly positioned within the first chamber 16 of cylinder 11 between the closed end 13 and piston means 12. The cushioning device includes first and second members 22, 23, a means 24 for forming variable volume chamber between the first and second members, and a means 27 for metering fluid from the variable volume chamber in response to relative movement between the first and second members in a direction for decreasing the volume of the variable volume chamber.

The first member 22 has an axially extending bore 28 and a pair of axially spaced annular grooves 29 in the outer peripheral surface thereof. A pair of wear rings 31 are individually seated in the grooves for sliding engagement with the inner surface of cylinder 11. A plurality of transverse grooves 32 in an end surface 33 connect with an axially extending passage 34. The second member 23 is slidably positioned within bore 28 and is retained therein by a ring 36 seated in an annular groove in the bore 28. A spring 37 resiliently urges the second member against ring 36. A transverse groove 38 in an end surface 39 of the second member communicates with an axially extending passage 41.

The means 26 includes third and fourth elongate tubular members 42, 43. The third member has a flanged end 44 sealingly seated within a counterbore of the second member 23. A bore 46 extends through the third member in axial alignment with the passage 41. The fourth member 43 is telescopically positioned within bore 46 of third member 42 and has a flanged end 47 sealingly seated within a counterbore in first member 22. A bore 48 in the fourth member is in axial alignment with passage 34. A spring 49 resiliently maintains the flanged ends 44, 47 seated within the counterbores of the first and second members respectively.

The means 27 includes a plurality of axially spaced orifices 51 extending through the wall of fourth member 43 and communicates the variable volume chamber 24 with the bore 48. The orifices are positioned to be sequentially closed by fourth member 43 in response to movement of first and second members 22, 23 in a direction for decreasing the volume of the variable volume chamber. The sequential closing of the orifices thereby progressively restricts the escape of fluid from the variable volume chamber.

A passage means 52 for passing fluid through the cushioning device 21 from one end to the other includes grooves 32, passage 34, bores 48, 46, passage 41, and groove 38.

INDUSTRIAL APPLICABILITY

In operation, to retract fluid jack 10 it will be understood that first chamber 16 is vented to tank while fluid under pressure is directed to second chamber 17 in any suitable manner, not shown, which causes piston means 12 to move downwardly toward closed end 13. It will be appreciated that gravitational or other forces acting on the piston rod 18 can cause the piston means 12 to descend quite rapidly, generating high inertia forces.

With the cushioning device 10 employed when the end of the piston rod 18 engages end surface 39 of second member 23, the second member and hence third member 42 are moved downwardly, decreasing the volume of variable volume chamber 24. Such movement of the second and third members 23, 42, however, is dependent upon the rate at which fluid is expelled from the variable volume chamber 24. As third member 42 moves downwardly, the lower end thereof sequentially blocks the axial spaced orofices 51 so as to cause the escape path of fluid from the variable volume chamber to be progressively restricted. As a result, a counteracting force is developed within the chamber which is effective in decelerating the movement of the piston means 12 in the last stages of the retracting stroke for stopping the piston means in a smooth controlled manner so as to alleviate any substantial impact between the piston means and the closed end 13.

Other aspects, objects, and advantages of this invention can be obtained from a study of the drawings, the disclosure, and the appended claims.

I claim:

1. In a fluid jack (10) having a cylinder (11), piston means (12) reciprocatably positioned within the cylinder (11) and movable toward and away from a closed end (13) of the cylinder (11), the improvement comprising:

a cushioning device (21) floatingly positioned within the cylinder (11) between the piston means (12) and the closed end (13) of the cylinder (11), said cushioning device (21) having a first member (22) slidably positioned within the cylinder (11) and having a bore (28), a second member (23) slidably positioned within said bore (28), means (26) for forming a variable volume chamber (24) between said first member (22) and said second member (23), and means (27) for metering fluid from said variable volume chamber (24) in response to relative movement between said first and second members (22, 23) in a direction for decreasing the volume of said variable volume chamber (24), said means (26) for forming a variable volume chamber (24) including a third elongate member (42) sealingly seated against one of said first and second members (22, 23) and having a bore (46) extending therethrough, and a fourth elongate member (43) sealingly seated against the other of said first and second members (22, 23) and telescopically extending into the bore (46) of said third member (42).

2. The fluid jack (10) of claim 1 wherein said means (27) for metering fluid includes a plurality of axially spaced orifices (51) in one of said third and fourth members (42, 43) and positioned to be sequentially closed by the other of said third and fourth members (42, 43) in response to telescopic movement of the fourth member (43) into the bore (46).

3. The fluid jack (10) of claim 2 including passage means (52) for passing fluid through the cushioning device (21) from one end (39) to the other end (33), said orifices (51) communicating the variable volume chamber (24) with said passage means (52).

* * * * *